United States Patent
Obersteiner et al.

(10) Patent No.: US 7,270,286 B2
(45) Date of Patent: Sep. 18, 2007

(54) FOOD PROCESSOR WITH INSIDE MOUNTED COVER-RETAINING MEANS

(75) Inventors: Heimo Obersteiner, Klagenfurt (AT); Hans Peter Krall, Eberstein (AT); Andreas Krall, Klagenfurt (AT); Herfried Pucher, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/580,628

(22) PCT Filed: Nov. 24, 2004

(86) PCT No.: PCT/IB2004/052533

§ 371 (c)(1),
(2), (4) Date: May 24, 2006

(87) PCT Pub. No.: WO2005/051150

PCT Pub. Date: Jun. 9, 2005

(65) Prior Publication Data

US 2007/0102551 A1    May 10, 2007

(30) Foreign Application Priority Data

Nov. 30, 2003    (EP) .................................. 03104462

(51) Int. Cl.
*A47J 43/046*    (2006.01)
*A47J 43/04*    (2006.01)

(52) U.S. Cl. .................... 241/282.2; 241/37.5; 241/92; 241/278.1; 241/282.1; 99/492; 99/510

(58) Field of Classification Search ............... 241/37.5, 241/92, 278.1, 282.1, 282.2; 99/492, 510
See application file for complete search history.

(56) References Cited

U.S. PATENT DOCUMENTS

| 6,340,124 | B1 | 1/2002 | Charles et al. |
| 6,418,837 | B1 | 7/2002 | Obersteiner |
| 6,481,342 | B2 | 11/2002 | Thackray |
| 6,814,323 | B2* | 11/2004 | Starr et al. ............... 241/282.2 |
| 6,971,597 | B2* | 12/2005 | Starr .......................... 241/92 |
| 6,986,476 | B2* | 1/2006 | Unteregger .............. 241/101.1 |
| 2003/0070564 | A1* | 4/2003 | Pavlovic et al. .............. 99/492 |

FOREIGN PATENT DOCUMENTS

| WO | WO 02/30253 | 4/2002 |
| WO | WO 02/43542 | 6/2002 |
| WO | WO 03/017814 | 3/2003 |

* cited by examiner

Primary Examiner—Derris H. Banks
Assistant Examiner—Jason Y. Pahng
(74) Attorney, Agent, or Firm—Adam L. Stroud

(57) ABSTRACT

In the case of a food processor (1) having a base unit (2) and having a work container (40) that can be placed on a housing wall (3) of the base unit (2), and having a cover (47) for the work container (40), retaining means (55) for retaining both the work container (40) on the base unit (2) and the cover (47) on the work container (40) are provided, wherein the retaining device (55) comprises at least one retaining member (70, 71) provided on the inside of the cover (47) and a retaining member (57) provided on a shaft configuration (9) comprising a drive shaft (10).

10 Claims, 6 Drawing Sheets

FOOD PROCESSOR WITH INSIDE MOUNTED COVER-RETAINING MEANS

The invention relates to a food processor containing a base unit, which base unit comprises a housing with a housing wall and in which base unit a motor is housed and which base unit comprises a shaft configuration rising from the housing wall and comprising a drive shaft drivable by means of the motor and led through the housing wall, and a work container, which work container comprises a bottom wall and a hollow-cylindrical extension rising from the bottom wall into the container interior and which work container, on an operation of the food processor, is supported by means of the housing wall and with its hollow-cylindrical extension at least partially surrounds the shaft configuration, and a cover for the work container, which cover is placed on the work container on an operation of the food processor, and retaining means for retaining both the work container on the base unit and the cover on the work container, which retaining means comprise a retaining member adjustably held on the cover and adjustable between a retaining position and a release position and a retaining member provided on the base unit, and adjusting means for adjusting the retaining member adjustably held on the cover between its retaining position and its release position, which adjusting means are adjustably held on the cover.

Such a food processor corresponding to the construction mentioned in the introduction in the first paragraph in known from the patent document U.S. Pat. No. 6,340,124 A1; in this patent document, the reader is referred to the construction illustrated in FIGS. 6a to 6h and the associated description of the drawings. In the known food processor, a pushbutton displaceable in the axial direction and two sliding locking members slidably guided substantially transversely to the axial direction are provided on the cover for the work container and on the base unit two locking projections are provided, the two sliding locking members being adjustable by means of the pushbutton between a locking position and a release position and the two sliding locking members provided on the cover in their locking position engaging behind the two locking projections provided on the base unit, so that when the sliding locking members are in their locking position, both the cover is retained or fixed on the work container and the work container is retained or fixed on the base unit of the food processor, without bayonet catches or other closures that are inconvenient to manipulate or are of complicated construction being required for this fixing. In the known food processor, two sliding locking members are provided lying on the outside of the cover and with their free ends, by means of which the sliding locking members co-operate with locking projections provided on the base unit, project in radial directions beyond the work container, in order to be able to co-operate with the locking projections. Furthermore, in the case of the known food processor the circumstances are such that the locking projections are provided on tower-like base unit extensions separately provided for that purpose, which extensions extend in the axial direction substantially from the housing wall supporting the work container during an operation. Since the sliding locking members are provided on the outside of the cover, there is a possibility that during an operation of the food processor the sliding locking members could, without operating the pushbutton, be unintentionally and inadmissibly displaced, which would lead to unintentional unlocking, whereby the cover and the work container would then no longer be properly held, which can lead or does lead at least to a disruption of operation. Furthermore, this gives rise to the problem that the sliding locking members and the locking projections co-operating with the-sliding locking members could be damaged. Another problem is that the tower-like extensions on which the locking projections are provided occupy a relatively large amount of space, which leads to rather undesirable enlargement of the food processor. Moreover, in the case of the known food processor, when placing the work container on the housing wall supporting the work container one must be careful to ensure that the work container is introduced between the two extensions projecting from that housing wall and carrying the locking projections.

It is an object of the present invention to eliminate the above-mentioned factors and problems in a known food processor corresponding to the construction mentioned in the introduction in the first paragraph, and to produce an improved food processor.

To achieve that object, in the case of a food processor according to the invention features according to the invention are provided so that a food processor according to the invention is characterizable in the manner specified hereinafter, namely:

Food processor containing a base unit, which base unit comprises a housing with a housing wall and in which base unit a motor is housed and which base unit comprises a shaft configuration rising from the housing wall and comprising a drive shaft drivable by means of the motor and led through the housing wall, and a work container, which work container comprises a bottom wall and a hollow-cylindrical extension rising from the bottom wall into the container interior and which work container, on an operation of the food processor, is supported by means of the housing wall and with its hollow-cylindrical extension at least partially surrounds the shaft configuration, and a cover for the work container, which cover is placed on the work container on an operation of the food processor, and retaining means for retaining both the work container on the base unit and the cover on the work container, which retaining means comprise a retaining member adjustably held on the cover and adjustable between a retaining position and a release position and a retaining member provided on the base unit, and adjusting means for adjusting the retaining member adjustably held on the cover between its retaining position and its release position, which adjusting means are adjustably held on the cover, wherein the retaining member adjustably held on the cover is arranged in the region of the inside of the cover and wherein the retaining member provided on the base unit is formed by means of the shaft configuration.

By providing the features according to the invention, in a very simple and structurally advantageous manner the retaining means adjustably held on the cover, and which are arranged in the region of the cover inside, can be adjusted exclusively by means of the adjusting means, so that unintentional adjustment of these retaining means is virtually excluded or at least largely avoided. Furthermore, the advantage is gained that all retaining means are located in the inner space closed off by the cover and by the work container, which inner space is already provided, meaning, in other words, that no additional space is required for the retaining means, so that the food processor is not enlarged by the retaining means.

In the case of a food processor according to the invention, the shaft configuration can have different constructions. For example, the shaft configuration can be formed merely by a single cylindrical shaft or axle held fixedly on the base unit, around which shaft or axle a tool drivable by means of the motor housed in the base unit is drivable in rotation in the work container. It has proved very advantageous, however, if the shaft configuration comprises a bearing sleeve held fixedly in the base unit, which bearing sleeve at its end facing the cover comprises the retaining member provided on the base unit. Such a construction offers the advantage that the shaft configuration comprises a component of hollow-cylindrical construction, namely the bearing sleeve, so that a further component of the food processor can be accommodated inside the bearing sleeve.

In the case of a food processor according to the invention, the retaining member provided on the bearing sleeve can be formed by a retaining ring mounted on the bearing sleeve. It has proved especially advantageous, however, if the retaining member provided on the bearing sleeve is formed by a groove provided on the bearing sleeve. This represents an especially simple construction, which ensures reliable retention.

In the case of a food processor according to the invention having a fixedly held bearing sleeve, it has proved especially advantageous if an adjustable control pin is accommodated in the bearing sleeve, which control pin is adjustably guided in the axial direction of the bearing sleeve and is adjustable between a rest position and an active position and which control pin, when the cover is in place on the container, is held in its active position by means of a control part accommodated in the cover. In this way, by simple structural means a control function is additionally realized, which can be initiated by means of the cover.

In the case of a food processor according to the invention as described in the preceding paragraph, it has proved very advantageous if additionally provision is made for a controllable driving device to be provided for driving the drive shaft of the shaft configuration, the driving device being controllable between a transmission mode of operation and an interrupted mode of operation, and, when the cover is in place on the container, the driving device is guided into its transmission mode of operation by means of the adjustable control pin. By this means, the driving device can be effective only when the cover is properly in place on the work container.

In the case of a food processor having a control pin adjustable in the bearing sleeve, it has moreover proved very advantageous if additionally provision is made for a safety switch arranged adjacent to the shaft configuration to be provided, which safety switch is switchable between a safety switch position and a release switch position, and, when the cover is in place on the container, for the safety switch to be switched into its release switch position by means of the adjustable control pin. By this means, the safety switch can be switched into its release switch position only when the cover is properly in place on the work container. The provision of such safety switch in a food processor has long been known per se, and in fact such a safety switch serves to release the power circuit for the motor, so that the motor can only be switched on when the safety switch is switched into its release switch position.

In the case of a food processor according to the invention, just a single retaining member or three or four or even more retaining members adjustable on the cover can be provided in the region of the inside of the cover. It has proved especially advantageous if two retaining members adjustable in opposite directions to one another are provided on the cover in the region of the inside of the cover. This is advantageous with regard to the best possible compromise between a reliable retention and a structural design that has as few and as simple components as possible.

In the case of a food processor according to the invention as described in the preceding paragraph, it has proved very advantageous if each of the two sliding locking members is biased towards its retaining position by means of at least one spring means and if the two sliding locking members and the adjusting means are constructed to adjust the two sliding locking members from their retaining position into their release position. By this means, the two sliding locking members are automatically biased by the at least one spring means in the direction towards their retaining position and hence an automatic retention is ensured.

In the case of a food processor having two sliding locking members, it has proved very advantageous if the adjusting means comprise a pushbutton movable with respect to the cover and by means of which the two sliding locking members are adjustable. This solution known per se from the patent document mentioned in the introduction has also proved very advantageous in the case of a food processor according to the invention, because it enables an especially simple and convenient operation to be achieved.

Let it be mentioned at this point that instead of sliding locking members as retaining means on the cover, other alternative retaining members can be provided, for example, pivotally mounted locking levers or locking members, which are both pivotally and slidably held. In the case of a food processor according to the invention it is also possible to provide a rocker switch or a turning knob as adjusting means instead of a pushbutton as adjusting means.

These and other aspects of the invention are apparent from and will be elucidated, by way of non-limitative example, with reference to the embodiments described hereinafter.

In the drawings

Figure 1:
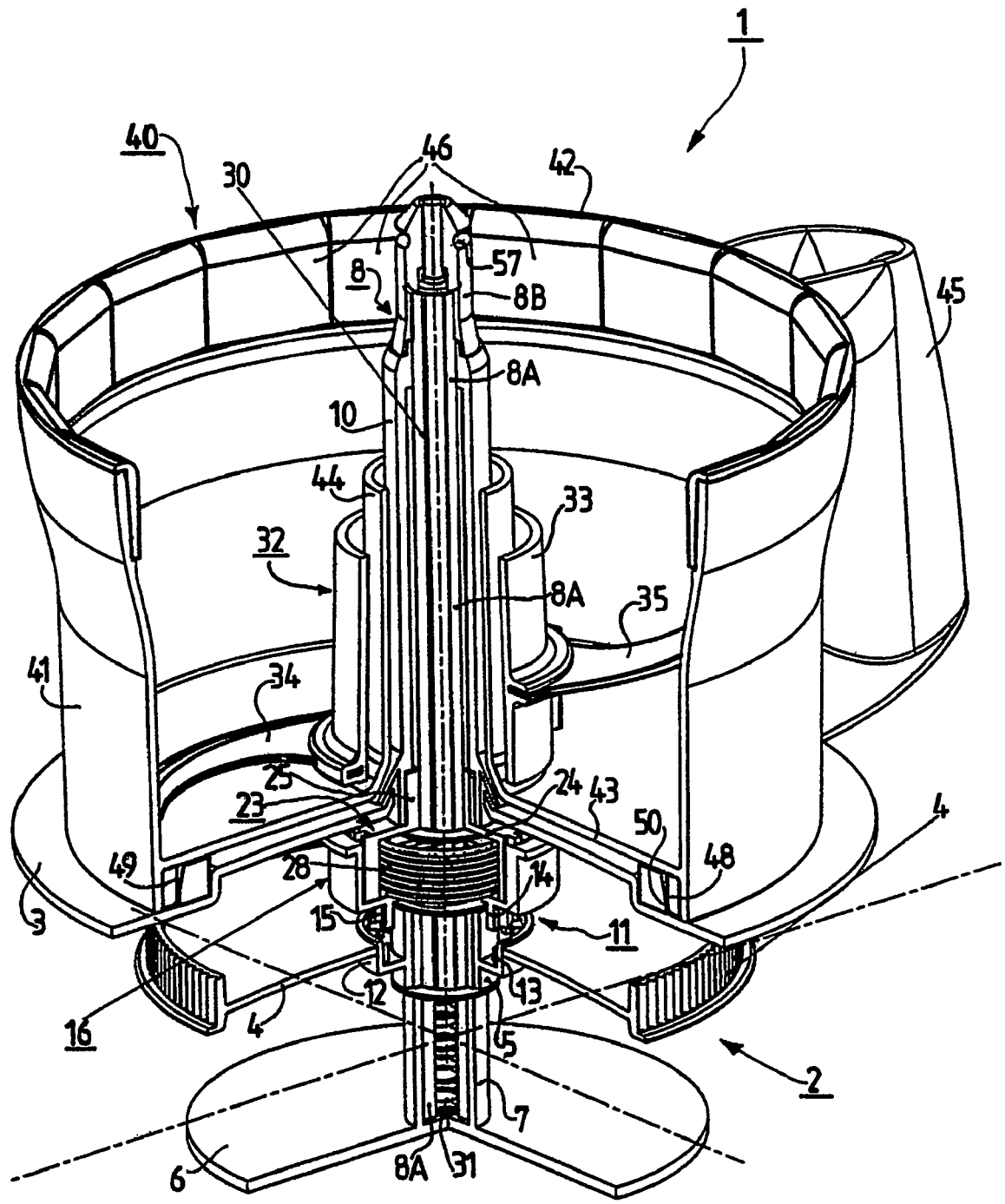
FIG. 1 shows in an oblique view from above a portion, essential to the invention, of a food processor according to a first exemplary embodiment of the invention, in which there is no cover in place on the work container of the food processor.

A portion of a food processor 1 is illustrated in FIGS. 1 to 4. Such food processors have actually been known for a long time. With regard to such food processors, reference can be made to the patent documents listed below, namely, U.S. Pat. No. 6,418,837 B1, WO 02/30253 A1, U.S. Pat. No.

6,481,342 B2, WO 02/43542 A1 and WO 03/017814 A1. Each of these food processors and also the food processor 1 according to FIGS. 1 to 4 contains a base unit 2, only partially illustrated in FIGS. 1 to 4. The base unit 2 comprises a housing, not seen in its entirety from FIGS. 1 to 4. The housing comprises a housing wall 3 illustrated in FIGS. 1 to 4. The base unit 2 accommodates a motor, not illustrated in FIGS. 1 to 4, which is provided for driving a tool of the food processor 1, details of which will be given hereinafter.

By means of the motor, not illustrated, a belt pulley 4 is driven in rotation by way of a toothed belt, likewise not illustrated. The belt pulley 4 has a hub portion 5. The belt pulley 4 is rotatably mounted with the hub portion 5 on a short bearing sleeve 7 held stationary in the base unit 2 by means of a supporting plate 6. A long bearing sleeve 8 extending virtually as far as the supporting plate 6 is introduced into this short bearing sleeve 7 and is held non-rotatably in the short bearing sleeve 7, so that in this way the long bearing sleeve 8 is held stationary in the base unit 2. In the case of the food processor 1, for the purposes of assembly the bearing sleeve 8 is in the form of two portions, namely, a long foot portion 8A and a top portion 8B, which is pressed onto the foot portion 8A at the free end of the foot portion 8A remote from the supporting plate 6, which top portion 8B is thus held stationary both in and on the base unit.

The long bearing sleeve 8 forms a component of the shaft configuration 9 extending from the housing wall 3. In addition to the long bearing sleeve 8, the shaft configuration 9 comprises a drive shaft 10 led through the housing wall 3 and drivable by means of the motor, not illustrated. In the present case, the drive shaft 10 is of hollow-cylindrical construction and is rotatably mounted on the long bearing sleeve 8. A controllable driving device 11 is provided for driving the hollow-cylindrical drive shaft 10 of the shaft configuration 9. The controllable driving device 11 is controllable between a transmission mode of operation, in which transmission of force or transmission of torque is enabled, and an interrupt mode of operation, in which no force transmission or torque transmission is possible. The controllable driving device 11 comprises a gearwheel 12 having an internal toothing 13 and connected in one piece with the belt pulley 4. In addition, the controllable driving device 11 comprises an axially adjustable gearwheel 14 having an external toothing 15. The adjustable gearwheel 14 is connected in one piece with a first bearing member 16, which comprises a first annular portion 17 and a first hollow-cylindrical portion 18 and a second annular portion 19 and a second hollow-cylindrical portion 20 as well as a third annular portion 21. By means of the first annular portion 17, the first bearing member 16 is rotatably mounted on the foot portion 8A of the long bearing sleeve 8. The adjustable gearwheel 14 projects from the second annular portion 19. A hollow-cylindrical portion 22 of a second bearing member 23 is received in the receiving space formed between the first hollow-cylindrical portion 18 and the second hollow-cylindrical portion 20. The second bearing member 23 comprises an annular portion 24 connected in one piece with the hollow-cylindrical portion 22 and extending from the hollow-cylindrical portion 22 towards the foot portion 8A and connected in one piece with the one hub portion 25 of the second bearing member 23. The hub portion 25 is rotatably mounted on the foot portion 8A of the long bearing sleeve 8. The hub portion 25 has an external toothing 26, which co-operates with an internal toothing 27 provided on the hollow-cylindrical drive shaft 10, so that by means of the external toothing 26 and the internal toothing 27 a non-rotatable connection is formed between the second bearing member 23 and the hollow-cylindrical drive shaft 10. Between the second bearing member 23 and the first bearing member 16 there is provided a compression spring 28 effective in the axial direction, which endeavors to move the first bearing member 23 and consequently the axially movable gearwheel 14 towards the gearwheel 12 with the internal toothing 13. To prevent such a movement, a control disc 29 is provided. The control disc 29 co-operates with the first annular portion 17 of the first bearing member 16.

The control disc 29 is fixedly connected with a long control pin 30 housed in the long bearing sleeve 8 and movably guided in the axial direction. The long control pin 30 is adjustable between a rest position illustrated in FIGS. 1 and 3 and an active position illustrated in FIGS. 2 and 4. An adjustment of the long control pin 30 axially and towards the supporting plate 6 is possible only against the force of a restoring spring 31 housed in the long bearing sleeve 8 and supported at one end on the supporting plate 6 and at the other end on-the long control pin 30. Compared with the compression spring 28, the restoring spring 31 has a much greater spring force.

Figure 2:
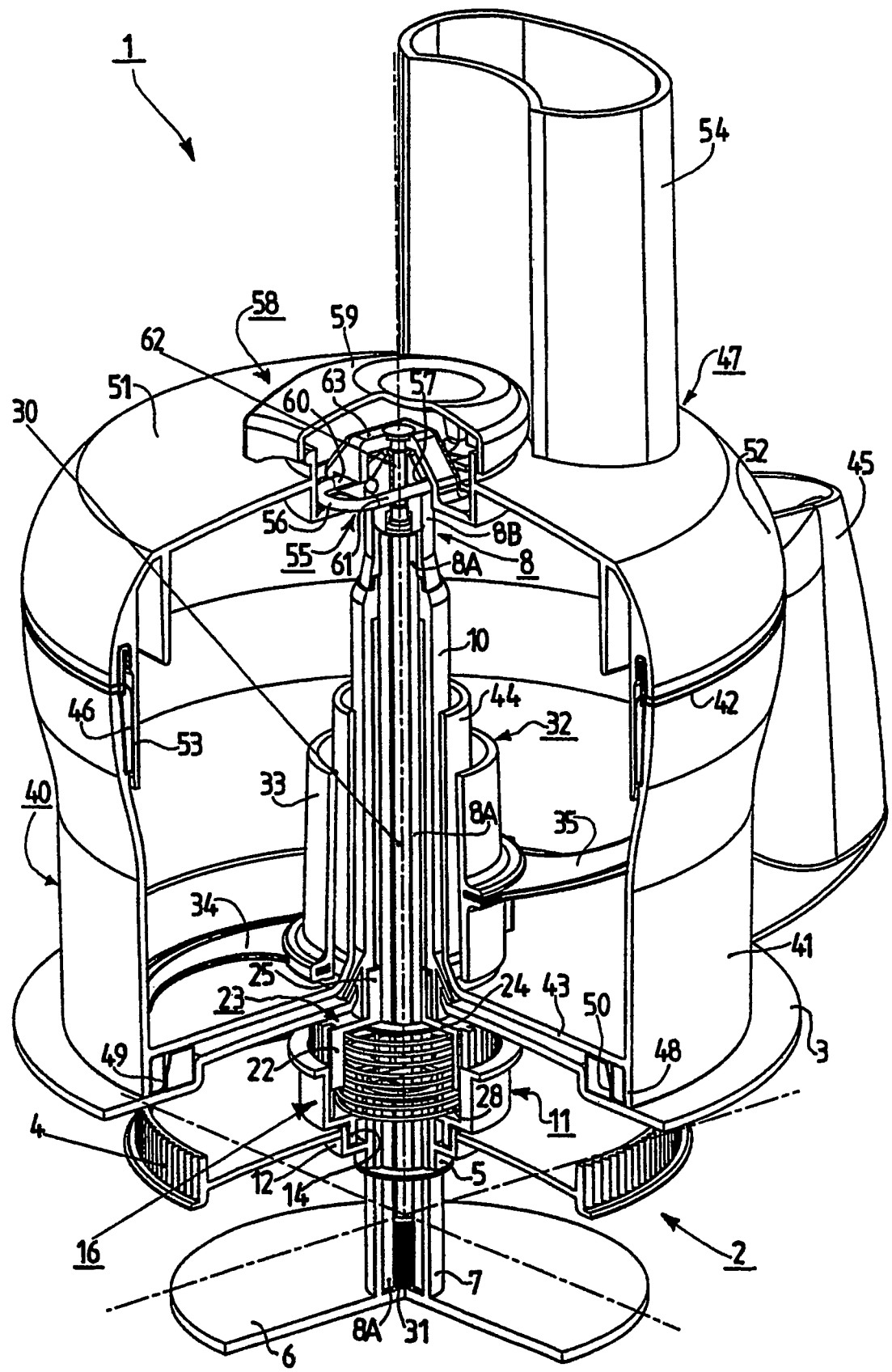
FIG. 2 shows similarly to FIG. 1 the same portion of the food processor according to FIG. 1, but with the cover in place on the work container.
Figure 3:
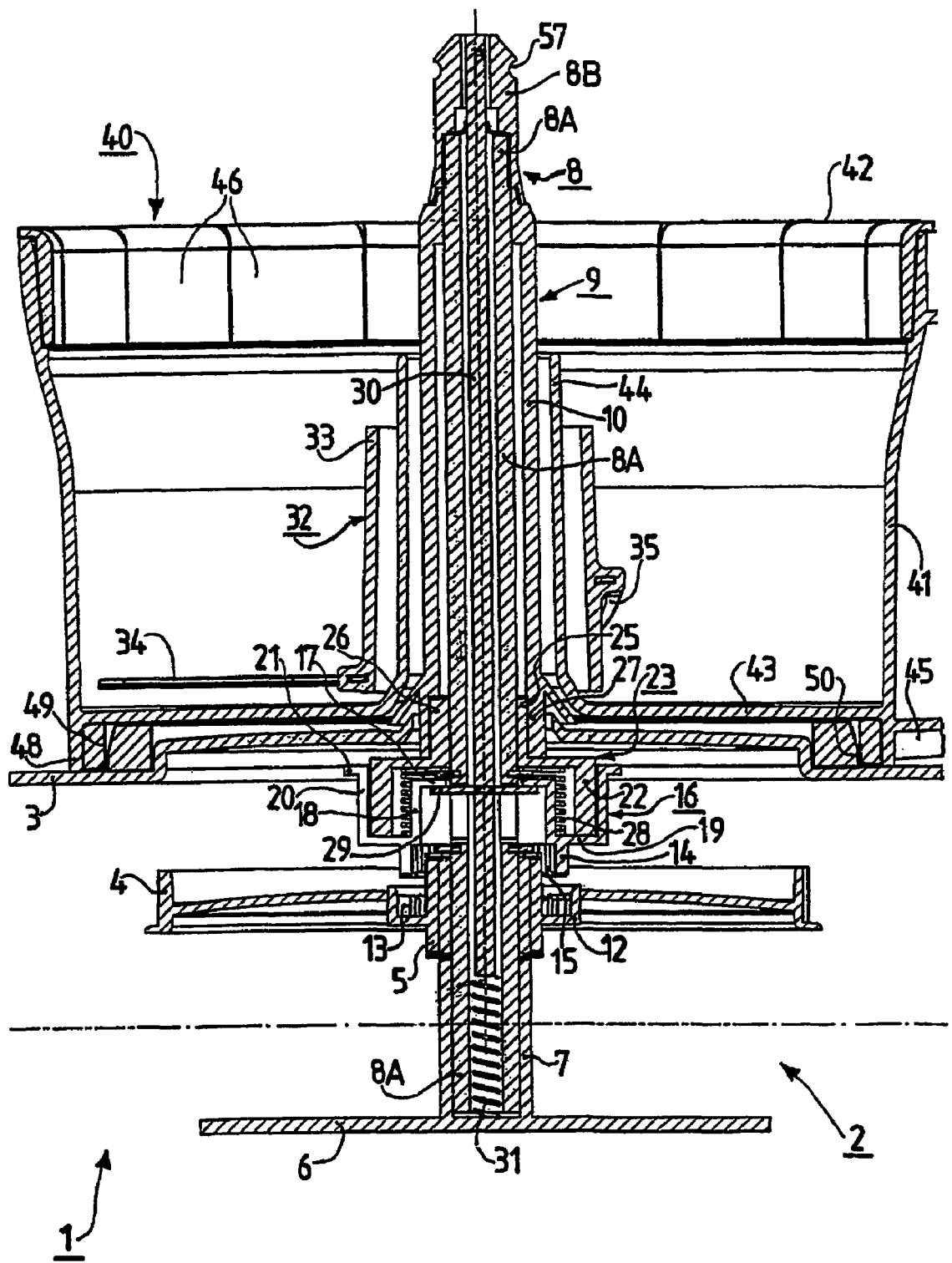
FIG. 3 shows in a cross-section the portion of the food processor illustrated in FIGS. 1 and 2, with no cover in place on the work container.

As long as the long control pin 30 is located in is rest position illustrated in FIGS. 1 and 3, the controllable driving device 11 constrained into its interrupt mode of operation. As soon as the long control pin 30 is located in its active position illustrated in FIGS. 2 and 4, the controllable driving device 11 is constrained into its transmission mode of operation. When the controllable driving device 11 is in its transmission mode of operation, the belt pulley 4 and the controllable driving device 11 and the hollow-cylindrical drive shaft 10 and a non-rotatable drive connection not evident from the FIGS. 1 and 4 drive a tool 32 in rotation, the tool in this particular case comprising a hub 33 of hollow-cylindrical construction with which two blades 33 and 35 are connected, which is likewise a configuration long known per se.

Figure 4:
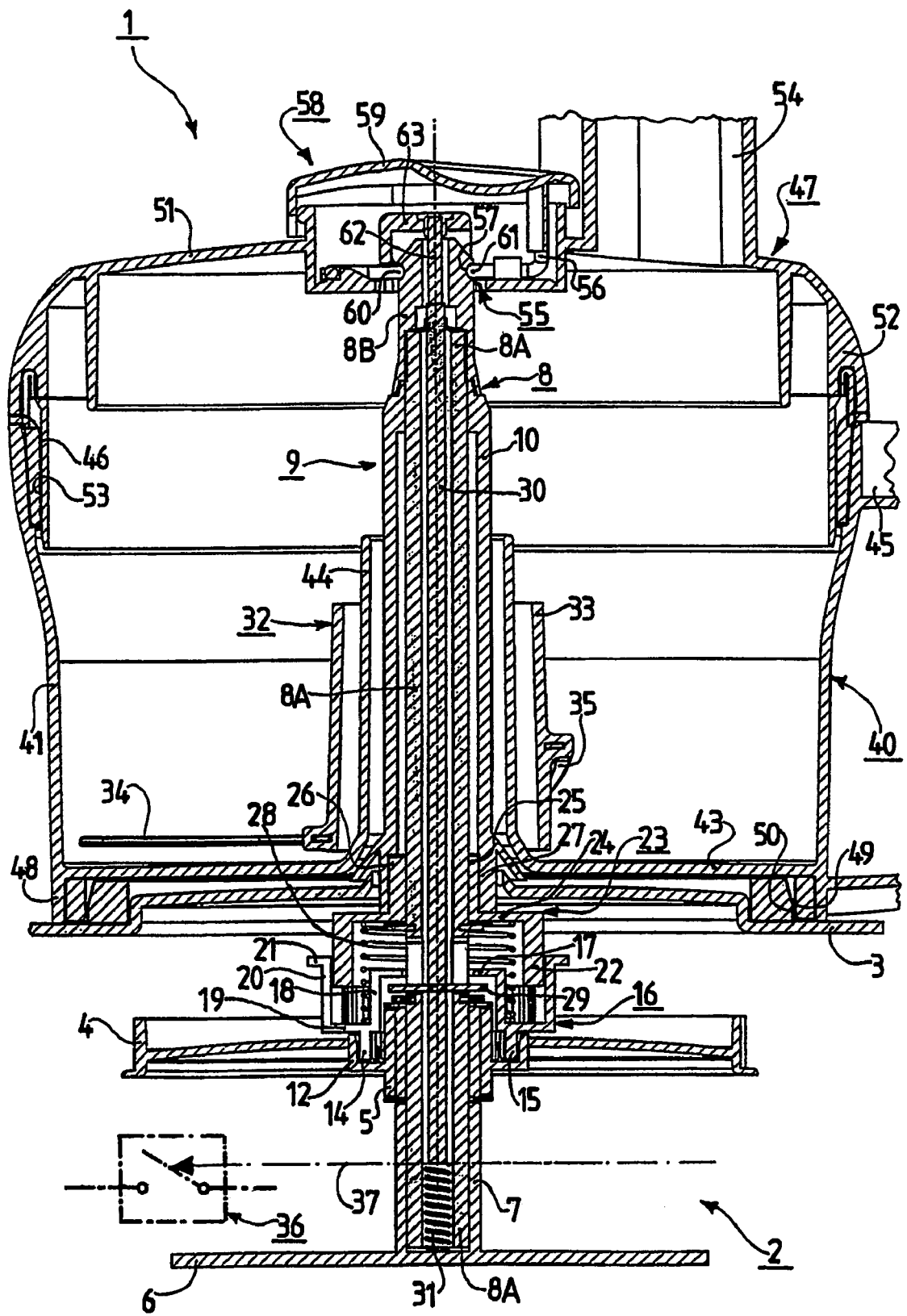
FIG. 4 shows similarly to FIG. 3 the portion illustrated in FIGS. 1 to 3 of the food processor according to FIGS. 1 to 3, the cover being in place on the work container.
Figure 5:
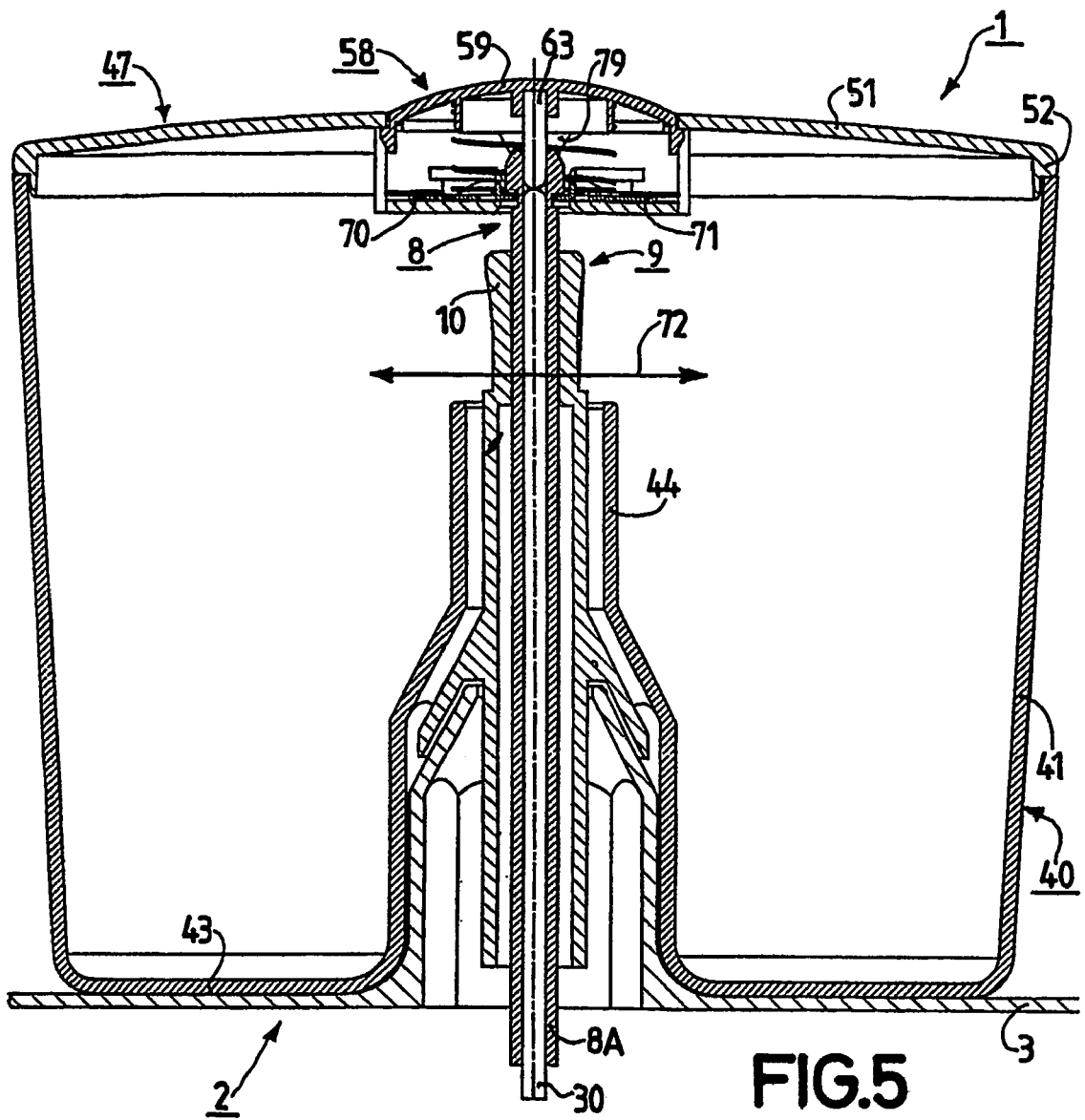
FIG. 5 shows similarly to FIG. 4 a portion of a food processor according to a second exemplary embodiment of the invention, a cover being in place on the work container.
Figure 6:
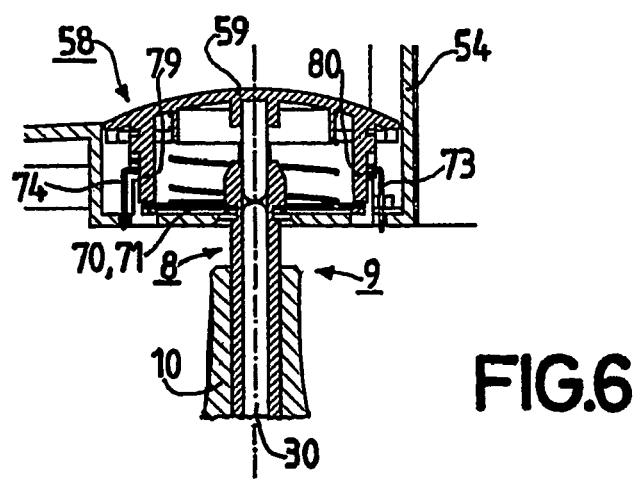
FIG. 6 shows in a section through the portion of the food processor according to FIG. 5 and in a plane according to FIG. 5 running perpendicular to the plane of the drawing, a portion of the food processor according to FIG. 5, said portion containing a pushbutton on the cover.
Figure 7:
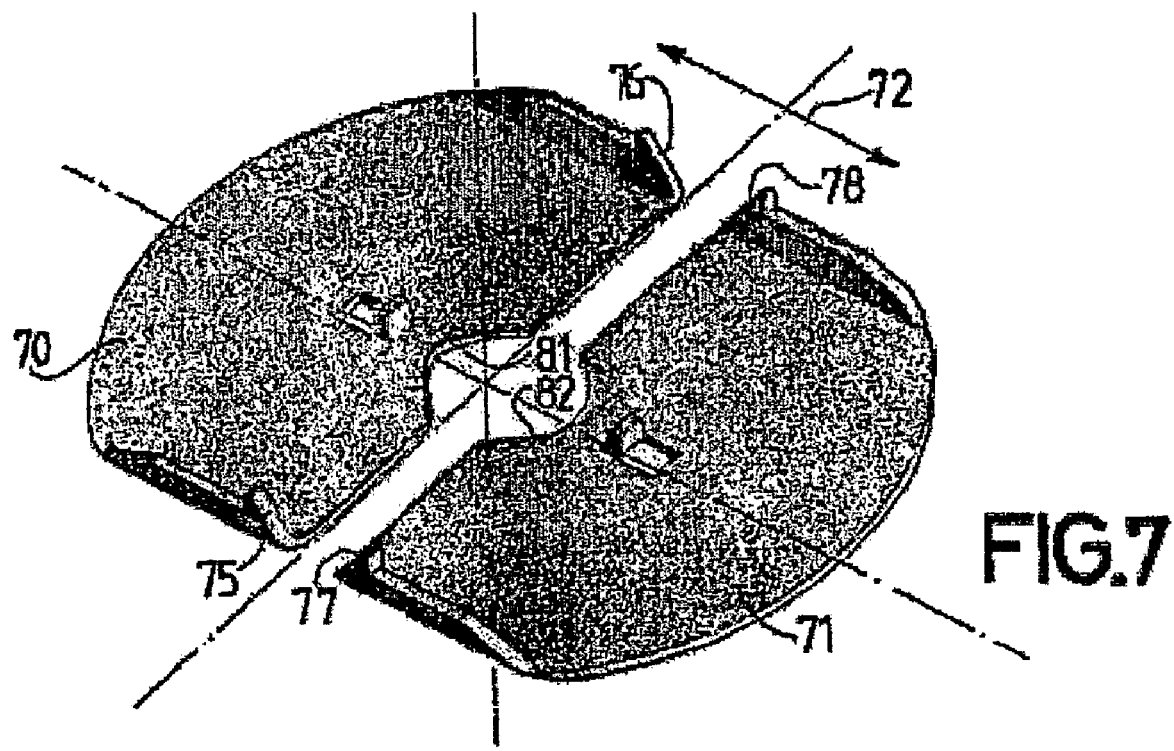
FIG. 7 shows in an oblique view from above, two sliding locking members contained in the food processor according to FIGS. 5 and 6.
Figure 8:
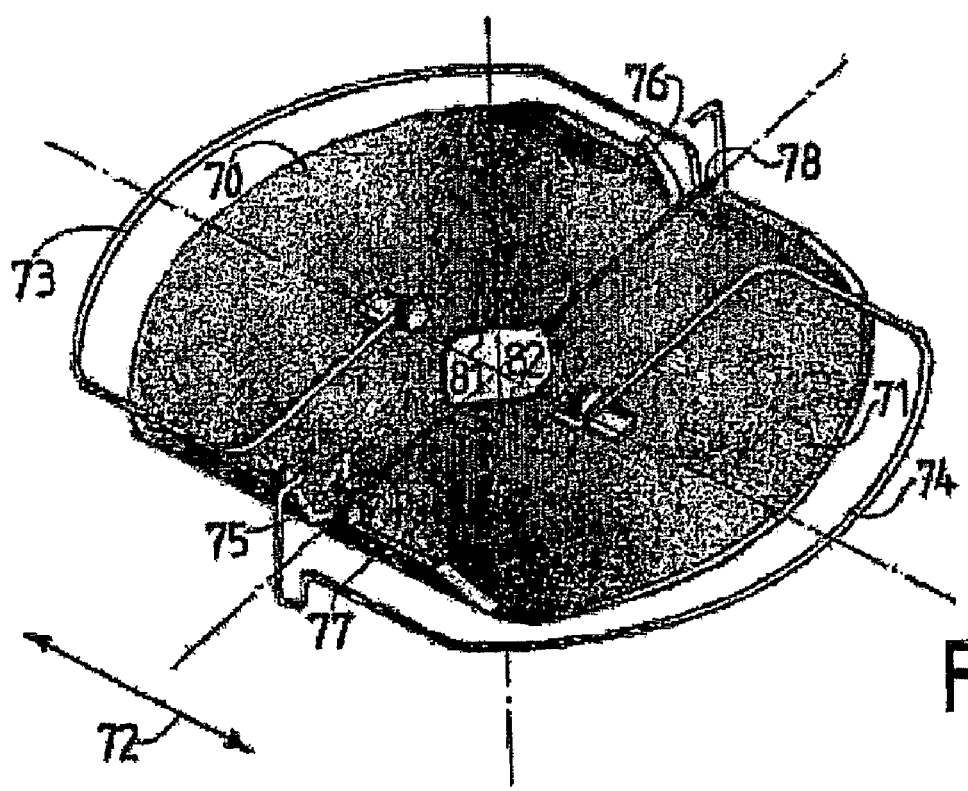
FIG. 8 shows similarly to FIG. 7 the two sliding locking members according to FIG. 7, wherein additionally two wire springs subjecting the two sliding locking members to spring bias are shown.

At this point, it should also be mentioned that in the case of the food processor 1 as shown in FIGS. 1 to 4—as is indicated highly schematically in FIG. 4—a safety switch 36 arranged adjacent to the shaft configuration 9 is provided. The safety switch 36 is switchable by way of an operative connection 37 by means of the long control pin 30 between a safety switch position and a release switch position. As long as the long control pin 30 is located in its rest position illustrated in FIGS. 1 and 3, the safety switch 36 is switched into its safety switch position, in which the safety switch 36 keeps the electric circuit for the motor, not illustrated, interrupted, so that switching on the motor and hence actuation of the tool 32 is prevented. As soon as the long control pin 30 is located in its active position illustrated in FIGS. 2 and 4, in which the safety switch 36 releases the electric circuit for the motor, not illustrated, so that the motor can then be switched on by operating a button, not illustrated, provided for that purpose, or by means of a remote control device, which subsequently, with the motor switched on, results in actuation of the tool 32.

The food processor 1 is furthermore equipped with a work container 40. The work container 40 comprises a substantially hollow-cylindrical outer wall 41 widening slightly in an upward direction, with an upper container rim 42, and a bottom wall 43 and a hollow-cylindrical extension 44 rising from the bottom wall 43 into the interior of the container. Moreover, the work container 40 has a handle 45. In the region of container rim 42, a plurality of wall portions 46 extending substantially flat are provided, which form an anti-rotation means for a cover 47 that can be placed on the work container 40, details of which are given below. The hollow-cylindrical lateral wall 41 comprises a downwardly extending hollow-cylindrical lengthening portion 48, with which lengthening portion 48 the work container 40 is placed on the housing wall 3 when the food processor is to be operated, so that during operation of the food processor the work container 40 is supported by means of the housing wall 3, the work container 40 partially surrounding the shaft configuration 9 with its hollow-cylindrical extension 44. In the region of the lengthening portion 48, the work container 40 is provided as in the region of the container rim 42 with a plurality of flat wall portions 49, which co-operate with flat counter-portions 50, which flat counter-portions 50 are connected with the housing wall 3 so that by means of the flat wall portions 49 and the flat counter-portions 50 an anti-rotation means is likewise achieved between the housing wall 3 and the work container 40.

As already mentioned, a cover 47 can be placed on the work container 40. On operation of the food processor 1, the cover 47 is placed on the work container 40, as is apparent from FIGS. 2 and 4. The cover 47 has a top wall 51 of slightly curved construction and a cover rim 52 extending substantially in the form of a hollow cylinder. With the cover rim 52 the cover 47 can be put in place on the work container 40. In the region of the cover rim 52, the cover 47 is provided with flat edge portions 53, which co-operate with the flat wall portions 46 and in this way form an anti-rotation means between the cover 47 and the work container 40. The cover 47 is equipped with a filling chute 54, through which filling chute 54 food to be processed can be introduced into the work container 40.

Retaining means 55 are provided in the food processor 1. The retaining means 55 are used both to retain the work container 40 on the base unit 2 and to retain the cover 47 on the work container 40. The retaining means 55 comprise a retaining member 56 adjustably held on the cover 47 and adjustable between a retaining position and a release position, and a retaining member 57 provided on the base unit 2. Here, the retaining member 56 held adjustably on the cover 47 is formed by a wire spring having a plurality of bends, the retaining member 56 formed by the wire spring advantageously being arranged in the region of the inside of the cover 47. The retaining member 57 provided on the base unit 2 is especially advantageously formed by means of the shaft configuration 9, wherein in the present case the retaining member 57 provided on the base unit 2 is provided on the fixedly held bearing sleeve 8, in fact on the top part 8B of the bearing sleeve 8, that is, at the end of the bearing sleeve 8 facing the cover 47. The retaining member 57 provided on the bearing sleeve 8 is here formed by a groove provided on the bearing sleeve 8, namely, on the top part 8B of the bearing sleeve 8.

Furthermore, adjusting means 58 are provided on the food processor 1 for adjusting the retaining member 56 adjustably held on the cover 57. By means of the adjusting means 58, the retaining member 56 adjustably held on the cover 47 is adjustable between its retaining position illustrated in FIGS. 2 and 4 and its release position illustrated in FIGS. 1 and 3. The adjusting means 58 are in this case held on the cover 47 so as to be adjustable, namely substantially in the axial direction of the shaft configuration 9. The adjusting means 59 comprise here a pushbutton 59 adjustable with respect to the cover 47 and by means of which two wire spring portions 60 and 61 of the wire spring-provided as retaining means 56, which wire spring portions are provided and constructed for co-operation with the retaining member 57 formed by the groove, are movable in a radially outward direction, so that these two wire spring portions 60 and 61 can be disengaged from the groove.

The pushbutton 59 is adjustable against the force of a restoring spring, not illustrated, from its rest position illustrated in FIGS. 2 and 4 towards the housing wall 3 into an unlocking position, in which unlocking position the wire spring portions 60 and 61 are disengaged from the groove provided as retaining member 57. The cover 47 also contains coaxial with the pushbutton 59 a short control pin 62, which is pressed into a supporting wall 63 of the cover 47.

In order to operate the food processor 1, first of all the work container 40 is placed on the housing wall 3 in a simple and easily manageable manner without having to operate a bayonet-type catch, wherein, to achieve an anti-rotation means for the work container 40, the flat wall portions 49 and the flat counter-portions 50 merely need to be brought into operative connection with one another, which if necessary is effected by just slight rotation of the work container 40 relative to the housing wall 3. Following that, the cover 47 is placed on the work container 40, the flat wall portions 46 and the flat rim portions 53 being brought into operative connection in order to ensure an anti-rotation means for the cover 47 relative to the work container 40. As the cover 47 is placed on the work container 40, the short control pin 62 ensures an adjustment of the long control pin 30 provided within the shaft configuration 9, with the result that the control disc 29 is displaced towards the supporting plate 6 and consequently towards the belt pulley 4, with the result that by means of the compression spring the first bearing member 16 and consequently the adjustable gearwheel 14 are displaced towards the belt pulley 4. As a result, the gearwheel 14 with the external toothing 15 comes into engagement with the gearwheel 12 with the internal toothing 13, so that the controllable driving device 11 is therefore brought into its transmission mode of operation, so that once the motor, not illustrated, has been switched on by the user of the food processor 1, operation of the food processor 1 can be started, the tool 23 inside the work container 40 closed by the cover 47 ensuring processing of the food contained in the work container 40, and so that via the connection 37 the safety switch 26 can be brought into its release switch position.

Subsequently, the user of the food processor 1 can switch off the motor again, after which the user will remove the cover 47 from the work container 40. To do this, the user must operate the pushbutton 59, with the result that the wire spring portions 60 and 61 are displaced out of the groove provided as retaining means 57, whereby the retaining action is cancelled. The result of this is that the previously compressed restoring spring 31 ensures displacement of the long control pin 30 contained in the shaft configuration 9, which results in switching of the safety switch 63 into its safety switch position and control of the controllable driving device 11 into its interrupted mode of operation and a displacement of the short control pin 63, which in turn results in the cover 47 being raised slightly from the work container 40. By this raising of the cover 47 from the work container 40, even in case the user has already released the pushbutton 59, the wire spring portions 60 and 61 can no longer enter the groove provided as retaining means 57, so that the retaining function ceases to exist.

In the case of the food processor 1 according to FIGS. 5 to 8, the construction is in itself similar to that of the food processor 1 according to FIGS. 1 to 4, but the retaining means 55 for retaining both the work container 40 on the base unit and the cover 47 on the work container 40 are of a different construction, which has proved especially advantageous. That is to say, two retaining members adjustable in opposite directions to one another are provided on the cover 47 in the region of the inside of the cover, the two retaining members adjustable in opposite directions to one another being formed by two slidably held sliding locking members 70 and 71, which are slidable parallel to a double arrow 72 illustrated in FIGS. 5, 7 and 8. Each of the two sliding locking members 70 and 71 is resiliently biased towards its retaining position (see FIG. 8) by means of a wire spring 73 respectively 74. Here, the two sliding locking members 70 and 71 and the adjusting means 58 likewise provided in this case are constructed for adjusting the two sliding locking members 70 and 71 from their retaining position illustrated in FIG. 8 into their release position illustrated in FIG. 7. For that purpose, each of the two sliding locking members 70 and 71 comprises two oblique adjusting faces 75 and 76 respectively 77 and 78. In addition, for that purpose the pushbutton 59 associated with the adjusting means 58 has two adjusting wedges 79 and 80, of which the first adjusting wedge 79 can be brought between the two oblique adjusting faces 75 and 77 and the second adjusting wedge 80 can be brought between the two oblique adjusting faces 76 and 78 by depressing the pushbutton 59, which causes the two adjustable slides 70 and 71 to be pushed apart. Each of the two adjustable slides 70 and 71 has an indentation 81 respectively 82, which two indentations 81 and 82 are provided and constructed to co-operate with the groove provided as retaining means 57 on the long bearing axle 8.

The invention claimed is:

1. Food processor containing a base unit, which base unit comprises:
    a housing with a housing wall and in which base unit a motor is housed and which base unit comprises a shaft configuration rising from the housing wall and comprising a drive shaft drivable by means of a motor and led through the housing wall, and
    a work container, which work container comprises a bottom wall and a hollow-cylindrical extension rising from the bottom wall into the container interior and which work container, upon operation of the food processor, is supported by means of the housing wall and with its hollow-cylindrical extension at' least partially surrounds the shaft configuration, and
    a cover for the work container, which cover is placed on the work container during operation of the food processor, and
    retaining means for retaining both the work container on the base unit and the cover on the work container, which the retaining means comprise at least one first retaining member adjustably held on the cover and adjustable between a retaining position and a release position and a second retaining member provided on the base unit,
    and adjusting means for adjusting the at least one first retaining member adjustably held on the cover between its retaining position and its release position, which adjusting means are adjustably held on the cover,
    wherein the at least one first retaining member adjustably held on the cover is arranged in the region of the inside of the cover, and
    wherein the second retaining member provided on the base unit is formed by means of the shaft configuration.

2. A food processor as claimed in claim 1, wherein the shaft configuration comprises a bearing sleeve held fixedly in the base unit, which bearing sleeve at its end facing the cover comprises the second retaining member provided on the base unit.

3. A food processor as claimed in claim 2, wherein the retaining member provided on the bearing sleeve is formed by a groove provided on the bearing sleeve.

4. A food processor as claimed in claim 2, wherein an adjustable control pin is accommodated in the bearing sleeve, which control pin is adjustably guided in the axial direction of the bearing sleeve and is adjustable between a rest position and an active position, and which control pin, when the cover is in place on the container, is held in its active position by means of a control part accommodated in the cover.

5. A food processor as claimed in claim 4, wherein a controllable driving device is provided for driving the drive shaft of the shaft configuration, the driving device being controllable between a transmission mode of operation and an interrupted mode of operation, and, when the cover is in place on the container, the driving device is guided into its transmission mode of operation by means of the adjustable control pin.

6. A food processor as claimed in claim 4, wherein a safety switch arranged adjacent to the shaft configuration is provided, which safety switch is switchable between a safety switch position and a release switch position, and wherein, when the cover is in place on the container, the safety switch is switched into its release switch position by means of the adjustable control pin.

7. A food processor as claimed in claim 1, wherein the at least one first member comprises two first retaining members adjustable in opposite directions to one another and are provided on the cover in the region of the inside of the cover.

8. A food processor as claimed in claim 7, wherein the two first retaining members adjustable in opposite directions to one another are formed by two slidably held sliding locking members.

9. A food processor as claimed in claim 8, wherein each of the two first retaining members comprises sliding locking members biased towards its retaining position by means of at least one spring means, and wherein the two sliding locking members and the adjusting means are constructed to adjust the two sliding locking members from their retaining position into their release position.

10. A food processor as claimed in claim 9, wherein the adjusting means comprise a pushbutton which is movable with respect to the cover and by means of which the two sliding locking members are adjustable.

* * * * *